(12) United States Patent
Grover et al.

(10) Patent No.: US 11,569,999 B1
(45) Date of Patent: Jan. 31, 2023

(54) DYNAMIC TOKENIZATION TABLE EXCHANGE

(71) Applicant: MICRO FOCUS LLC, Santa Clara, CA (US)

(72) Inventors: Douglas Max Grover, Provo, UT (US); Vamsi Krishna, Bangalore (IN)

(73) Assignee: Micro Focus LLC, Santa Clara, CA (US)

( * ) Notice: Subject to any disclaimer, the term of this patent is extended or adjusted under 35 U.S.C. 154(b) by 0 days.

(21) Appl. No.: 17/371,914

(22) Filed: Jul. 9, 2021

(51) Int. Cl.
*H04L 9/32* (2006.01)
*H04L 9/08* (2006.01)

(52) U.S. Cl.
CPC .......... *H04L 9/3213* (2013.01); *H04L 9/0825* (2013.01); *H04L 9/0866* (2013.01); *H04L 9/3242* (2013.01)

(58) Field of Classification Search
CPC ... H04L 9/3213; H04L 9/0825; H04L 9/0866; H04L 9/3242
See application file for complete search history.

(56) References Cited

U.S. PATENT DOCUMENTS

| | | | |
|---|---|---|---|
| 5,426,426 A * | 6/1995 | Hymel | H04W 88/185 340/7.22 |
| 8,850,540 B2 | 9/2014 | Lin | |
| 8,943,574 B2 | 1/2015 | Bailey | |
| 9,088,561 B2 * | 7/2015 | Rogers | H04L 63/0807 |
| 9,785,797 B2 | 10/2017 | Rozenberg et al. | |
| 10,469,487 B1 | 11/2019 | Griffin et al. | |
| 2004/0073621 A1 * | 4/2004 | Sampson | G06Q 20/04 707/999.009 |
| 2006/0015566 A1 * | 1/2006 | Sampson | H04L 51/212 709/206 |
| 2007/0294435 A1 * | 12/2007 | Huang | H04L 47/35 709/251 |
| 2013/0145450 A1 * | 6/2013 | Gamble | H04L 63/0807 726/9 |
| 2015/0032627 A1 * | 1/2015 | Dill | H04L 9/32 705/44 |
| 2015/0046338 A1 * | 2/2015 | Laxminarayanan | G06Q 20/38215 705/67 |
| 2017/0124557 A1 * | 5/2017 | Malliah | H04L 9/3234 |
| 2020/0389552 A1 * | 12/2020 | Trim | H04W 12/61 |

(Continued)

OTHER PUBLICATIONS

U.S. Appl. No. 17/183,973, filed Feb. 24, 2021, Krishna, et al.

(Continued)

*Primary Examiner* — Techane Gergiso
(74) *Attorney, Agent, or Firm* — Sheridan Ross P.C.

(57) ABSTRACT

A first network device nonce is computed. The first network device nonce is based on a first network device secret. A Change Token Table message (CTTM) is sent to a second network device. The CTTM comprises the first network device nonce. A Change Token Table Ack Message (CT-TAM) with a second network device nonce is received from the second network device. A new token for a tokenization table is computed based on the first network device secret, the second network device nonce, a prime number, and a key derivation function. The new token for the tokenization table is also computed by the second network device based on a second network device secret, the first network device nonce, the prime number, and the key derivation function.

20 Claims, 3 Drawing Sheets

(56) References Cited

U.S. PATENT DOCUMENTS

2021/0051146 A1  2/2021  Stolbikov et al.
2021/0152345 A1  5/2021  Beloskur et al.

OTHER PUBLICATIONS

Chen, et al; Verifiable Computation over Large Database with Incremental Updates; Esorics 2014, Part 1, LNCS 8712, 15 pages; 2014.
Nugier, et al; An Upcycling Tokenization Method for Credit Card Numbers; Hall ID: hal-03220739; https://hal.archives.ouvertes.fr/hal-03220739; May 7, 2021; 12 pages.

* cited by examiner

DYNAMIC TOKENIZATION TABLE EXCHANGE

FIELD

The disclosure relates generally to tokenization tables and particularly to systems and methods for dynamically exchanging tokenization tables.

BACKGROUND

Today, when tokenization tables are created, the tokens in the tokenization table typically do not change. Even if the data pointed to by the token changes, the token itself that references the data typically remains the same. This can lead to security issues if any of the tokens in the tokenization table is compromised. Currently the only way to resolve this issue is to encrypt the whole tokenization table (including the data) and then send the whole tokenization table over the network. Anytime the actual data is sent across an unsecure network, there is more risk of the data being compromised.

In addition, because of the static nature of tokenization tables, if the size of the tokenization table changes, for example the size of the tokenization table needs to be increased, the whole tokenization table has to be exchanged instead of just the changes.

SUMMARY

These and other needs are addressed by the various embodiments and configurations of the present disclosure. The present disclosure can provide a number of advantages depending on the particular configuration. These and other advantages will be apparent from the disclosure contained herein.

A first network device nonce is computed. The first network device nonce is based on a first network device secret. A Change Token Table message (CTTM) is sent to a second network device. The CTTM comprises the first network device nonce. A Change Token Table Ack Message (CTTAM) with a second network device nonce is received from the second network device. A new token for a tokenization table is computed based on the first network device secret, the second network device nonce, a prime number, and a key derivation function. The new token for the tokenization table is also computed by the second network device based on a second network device secret, the first network device nonce, the prime number, and the key derivation function.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
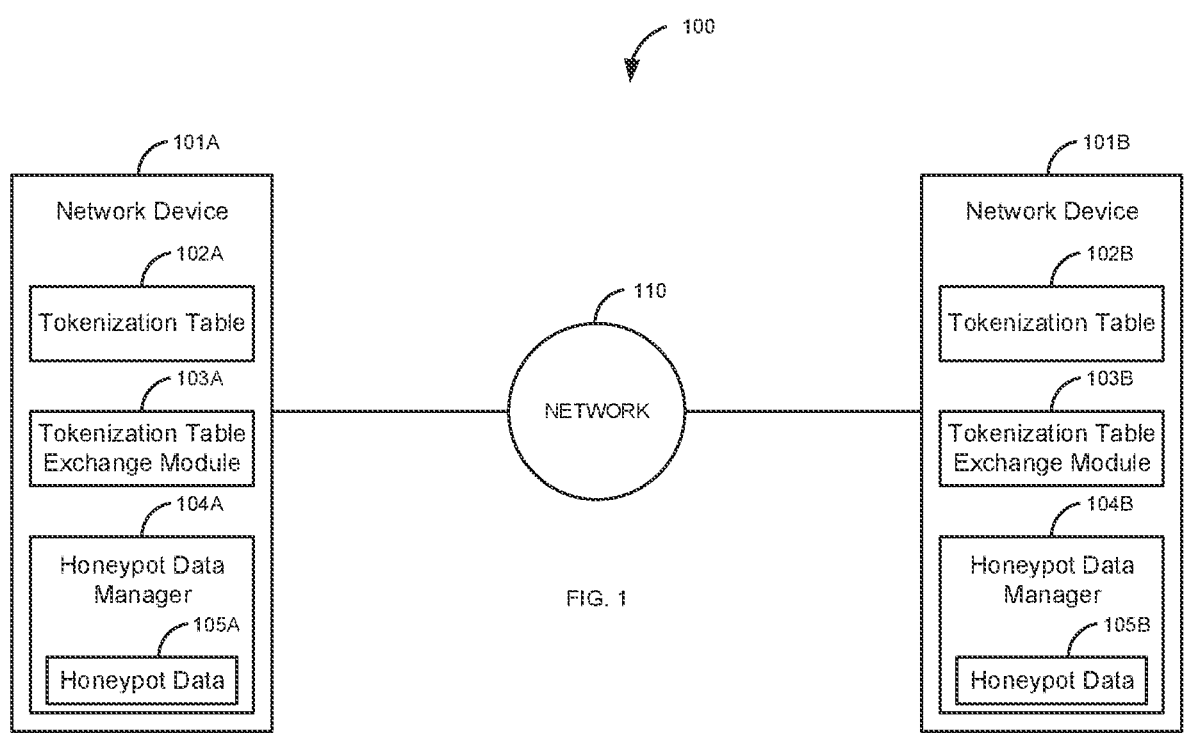
FIG. 1 is a block diagram of a first illustrative system for exchanging tokenization tables over a network

FIG. 1 is a block diagram of a first illustrative system 100 for exchanging tokenization tables 102 over a network 110. The first illustrative system 100 comprises network devices 101A-101B and network 110.

The network devices 101A-101B can be or may include any networked device that can communicate on the network 110, such as a Personal Computer (PC), a client device, a mobile device, a smartphone, a server, a card reader, a database server, an authentication server, an embedded device, a web server, and/or the like. While FIG. 1 only shows two network devices 101A-101B connected to the network 110, any number of network devices 101 can be connected to the network 110.

The communication devices 101A-101B comprise tokenization tables 102A-102B, tokenization table exchange modules 103A-103B, and honeypot data managers 104A-104B. The tokenization tables 102A-102B are copies of a single tokenization table 102 that have been exchanged between the network devices 101A-101B via the network 110. The tokenization tables 102A-102B can be or may include any known types of tokenization tables 102.

The tokenization table exchange modules 103A-103B can be or may include hardware coupled with software that can exchange and manage tokenization tables 102. The tokenization table exchange modules 103A-103B may also include encryption functions that allow for exchanging data associated with tokens in the tokenization tables 102A-102B.

The honeypot data managers 104A-104B manage unused portions of a tokenization table 102. The tokenization managers 104A-104B can backfill unused portions of the tokenization tables 102 with invalid information stored in the honeypot data 105A-105B. The honeypot data 105A-105B may comprise false information, such as, invalid social security numbers, invalid credit card information, false user names, false addresses, invalid passwords, invalid/false financial information, false account numbers, and/or the like. In one embodiment, the honeypot data managers 104A-104B may automatically generate the honeypot data 105 based on an algorithm. In another embodiment, if the size of the tokenization table 102 is large in relation to the number of tokens in the tokenization table 102, the honeypot data manager 104 may select random item(s) from the honeypot data to provide when an invalid token is presented (i.e., someone is trying to hack the tokenization table 102 with an invalid token).

The network 110 can be or may include any collection of communication equipment that can send and receive electronic communications, such as the Internet, a Wide Area Network (WAN), a Local Area Network (LAN), a packet switched network, a circuit switched network, a cellular network, a combination of these, and/or the like. The network 110 can use a variety of electronic protocols, such as Ethernet, Internet Protocol (IP), Transmission Control Protocol (TCP), Secure Sockets Layer (SSL), Hyper Text Markup Language (HTML), Hyper Text Transfer Protocol (HTTP), Web Real-Time Protocol (Web RTC), and/or the like. Thus, the network 110 is an electronic communication network configured to carry messages via packets and/or circuit switched communications.

Figure 2:
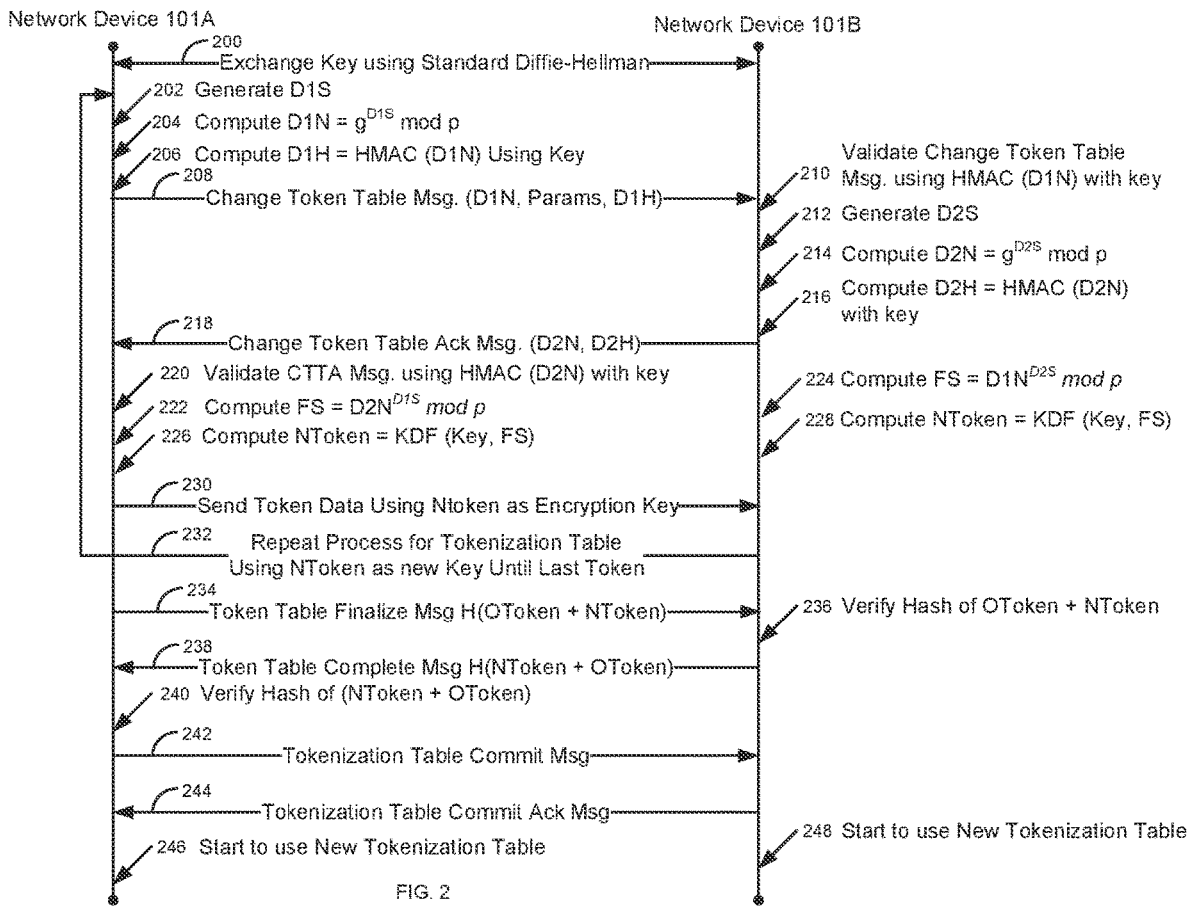
FIG. 2 is a flow diagram of a first process for exchanging tokenization tables and optionally tokenization data over a network.
Figure 3:
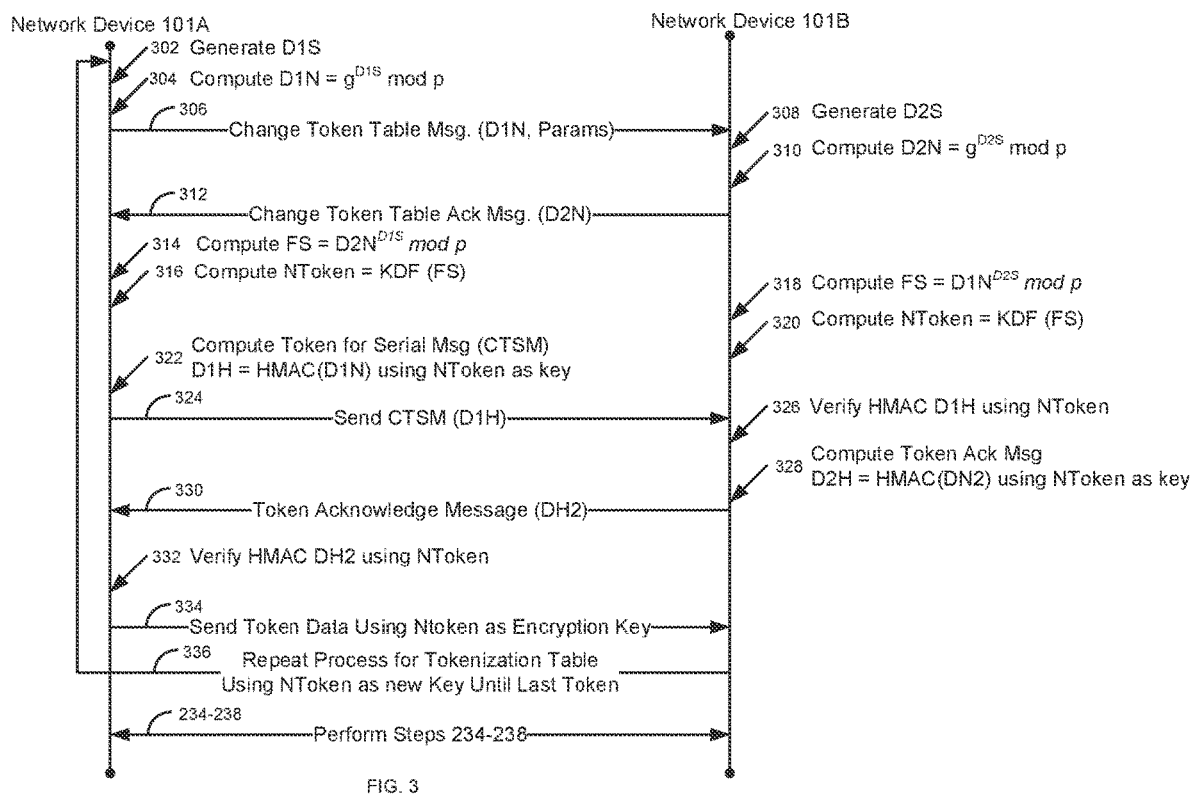
FIG. 3 is a flow diagram of a second process for exchanging tokenization tables and optionally tokenization data over a network.

FIG. 2 is a flow diagram of a first process for exchanging tokenization tables 102 and optionally tokenization data over a network 110. Illustratively, the network devices 101A-101B, the tokenization exchange modules 103A-103B, and the honeypot data managers 104A-104B are stored-program-controlled entities, such as a computer or microprocessor, which performs the method of FIGS. 2-3 and the processes described herein by executing program instructions stored in a computer readable storage medium, such as a memory (i.e., a computer memory, a hard disk, and/or the like). Although the methods described in FIGS. 2-3 are shown in a specific order, one of skill in the art would recognize that the steps in FIGS. 2-3 may be implemented in different orders and/or be implemented in a multi-threaded environment. Moreover, various steps may be omitted or added based on implementation.

The process of FIG. 2 assumes that network device 101A has the data for tokenization, such as shown below in Table 1. Initially, the network device 101A does not have any defined tokens for the data values as shown below in Table 1.

TABLE 1

| Token | Token Number | Data (e.g., Credit Card #) |
|-------|--------------|----------------------------|
|       | 1            | 1234567890                 |
|       | 2            | 3456789012                 |
|       | N            | 6789012345                 |

The tokenization table 102 in Table 1 is a illustrative example of a tokenization table 102 that contains exemplary credit card numbers. The types of data in the tokenization table 102 may be any kind of data. The size of the tokenization table 102 of Table 1 is N in length. In other words, the size of the tokenization table 102 in Table 1 can be any length. Some tokenization tables 102 may have a 1 to 1 correlation between a token and data. In other tokenization tables 102, there may be fewer tokens/data than the size of the tokenization table 102. In these tokenization tables 102, there are empty spaces where a token does not have corresponding data. The "Token Number" column is for illustrative purposes to indicate a position in the tokenization table 102. In a typical embodiment, the Token Number column may not exist.

The process of tokenization table 102 exchange can work in different ways. In one embodiment, the whole tokenization table 102 (including the data) is exchanged. In another embodiment, only the tokens are exchanged over the network 110 (not the data). The two processes are described in FIG. 2.

The process starts, in step 200, where network device 101A and network device 101B exchange a key using standard Diffie-Hellman. Diffie-Hellman is a known process that is used to exchange encryption keys (e.g., see https://en.wikipedia.org/wiki/Diffie%E2%80%93Hellman_key_exchange, which is incorporated herein by reference). Diffie-Hellman is a process where the encryption key is exchanged using an algorithm that is extremely difficult to break using current computer processing methods. The key to the Diffie-Hellman algorithm and the tokenization processes described herein is that it would take an enormous amount of computer processing power to break. A person (e.g., using a pen and paper) could not realistically break the Diffie-Hellman encryption algorithm and the novel processes described herein.

The network device 101A generates a device 1 secret (D1S) in step 202. For example the network device 101A generates the device 1 secret (D1S) using a random number generator. A nonce for the network device 101A (D1N) is computed, in step 204, where $D1N = g^{D1S} \mod p$ where g is a generator (e.g., usually 2) and p=a large prime number (e.g., greater than 600 bits). The network device 101A computes, in step 206, a D1H using a Hashed Message Authentication Code (HMAC of the device nonce (D1N) using the key (the key that both devices have from step 200). The HMAC process is a known process (see https://en.wikipedia.org/wiki/HMAC#:~:text=In%20cryptography%2C%20an%20HMAC%20(sometimes, and %20a%20secret%20cryptographic%20key, which is incorporated herein by reference). The purpose of D1H is to stop a hacker (e.g., a man in the middle) from sending the message of step 208, with a different D1N, which would cause the two devices to have different tokens in their respective tokenization tables 102.

The network device 101A sends, in step 208, a Change Token Table Message (CTTM) that includes the D1N, Diffie-Hellman parameters (e.g., g and p), and D1H. The CTTM message indicates that network device 101A is going to send the tokenization table 102 to the network device 101B.

The network device 101B validates the CTTM using a HMAC (DN1) with the key (exchanged in step 200) in step 210. The network device 101B computes a device secret (D2S) in step 212. For example, the network device 101B uses a random number generator to generate the device secret (D2S). The network device 101B computes the network device 101B nonce as $D2N = g^{D2S} \mod p$ in step 214. The network device 101B computes the D2H as HMAC (D2N) with the key in step 216. Network device 101B send a Change Token Table Acknowledgement Message (CTTAM) with the D2N and the D2H in step 218.

The network device 101A validates the CTTAM using the HMAC(D2N) using the key in step 220. The network device 101A computes a final secret $(FS) = D2N^{D1S} \mod p$ in step 222. Likewise, the network device 101B computes the $FS = D1N^{D2S} \mod p$ in step 224. The network device 101A computes the new token (NToken) as KDF (Key, FS) in step 226. Likewise, network device 101B computes the new token (NToken) as KDF (Key, FS) in step 228. At this point, both the network device 101A and the network device 101B now first the first token for in the tokenization table 102 (e.g., 11BCNX114433X4). At this point, network device 101B does not yet have the data for the token.

The data 1234567890 for the first token 11BCNX114433X4 can be sent in step 230 in various ways. In one embodiment, the data can be sent by using the NToken 11BCNX114433X4 as the encryption key. For example, the data 1234567890 for the NToken 11BCNX114433X4 could be sent, in step 230, using a Data Encryption Standard (DES) 256 encryption algorithm (or any known encryption algorithm) using NToken as the encryption key and the corresponding data (1234567890) as an input. Alternatively, the key for the encryption algorithm could be generated based on a KDF of the NToken+data.

An alternative to encrypting the data using the NToken is for the network device 101A to send, in step 230, a hash (e.g., SHA 256) of (NToken+data). The network device 101B does a loop of SHA256 (token+1) . . . SHA 256 (token+N) until it reaches the value of 1234567890. If the size of the data is large, the data can be broken into smaller parts and the same processes is used on the smaller parts. For example, the credit card number of 1234567890 could be divided into two parts (12345 and 67890) and the two parts could be sent separately and regenerated using the above process. The process could be minimized if the size is fixed. It will be difficult to hack because a hacker has no knowledge of the data/NToken.

After step 230, both network device 101A and network device 101B have the first token 11BCNX114433X4 and the data associated with the token as shown below in Table 2.

TABLE 2

| Token | Token Number | Data |
|---|---|---|
| 11BCNX114433X4 | 1 | 1234567890 |

The process is repeated for the tokens 2-N and the data (3456789012 and 6789012345) in steps 202-232. The NToken generated in steps 226/222 is used as the common key for generating the next token in the tokenization table 102. As a result the network device 101A and the network device 101B now have the same tokenization table 102 as shown below in FIG. 4.

TABLE 3

| Token | Token Number | Data |
|---|---|---|
| 11BCNX114433X4 | 1 | 1234567890 |
| 02ZQT42432AZX5 | 2 | 3456789012 |
| ACR1B1548X476T | N | 6789012345 |

Once the final token is generated in steps 226/228 and the data for the final token is sent in step 230, the network device 101A sends, in step 234, a token table finalize message (TTFM) that includes a hash of the old token (could be the original key or the N−1 token)+the new token (token N). The network device 101B verifies the hash of the old token+the new token in step 236. The network device 101B sends, in step 238, a token table complete message (TTCM) that has a hash of the new token+the old token (the reverse of step 234). The network device 101A verifies the hash of the new token+the old token in step 240. The network device 101A then sends a tokenization table commit message (TTCM) in step 242. The network device 101B sends a tokenization table commit acknowledgement (TTCA) message in step 244. A this point, both the network device 101A and the network device 101B can now start to use the new tokenization table 102 in steps 246 and 248 respectively.

At a later point in time, if an update to the tokenization table 102 is wanted. For example, there are new credit card numbers that need to be added to the tokenization table 102, the same process can be used to update the tokenization table 102.

If new tokens/data are added at the end of the tokenization table 102, the process can only send the update to the table. In this case the message of step 208 would be an add to token table message (ATTM). The process would then exchange new updates to the tokenization table 102. The update would then be added to the tokenization table 102.

Another key advantage is that this same process can be used to only change the tokens. For example, if the tokens were to be periodically changed, the same process can be used to only update the tokens (not the data). To do this, the message 208 would indicate that the exchange is only for exchanging tokens (a change tokens only message (CTOM)). In this embodiment, step 230 is not used because there is no need to send the data. The process of dynamically just changing the tokens in the tokenization table 102 may work with any existing tokenization tables 102 and is not dependent upon how the data/tokens are initially exchanged.

The above process can have a check if the same token is generated for a second entry in the tokenization table 102 (a possibility if the token size is the same as the size of the tokenization table 102). For example, if you have the tokenization table size that is the same as the data size, it will ensure that each token in the tokenization table 102 is generated properly and there are no duplicate entries.

FIG. 3 is a flow diagram of a second process for exchanging tokenization tables 102 and optionally tokenization data over a network 110. FIG. 3 is an alternative way to send tokens/tokenization data over the network 110 that is different from the process described in FIG. 2. As one of skill in the art would recognize, there may be various ways to implement a tokenization table exchange.

The process of FIG. 3 assumes that network device 101A has the data for tokenization, like shown in Table 1. The process of tokenization table exchange works in the same ways described in FIG. 2, but based on a different implementation.

The process starts, in step 302, where the network device 101A generates a device 1 secret (D1S). For example the network device 101A generates the device 1 secret (D1S) using a random number generator. A nonce for the network device 101A (D1N) is computed, in step 304, where D1N=$g^{D1S}$ mod p where g is a generator (e.g., usually 2) and p=a large prime number (e.g., greater than 600 bits).

The network device 101A sends, in step 306, a Change Token Table Message (CTTM) that includes the D1N and the Diffie-Hellman parameters (e.g., g and p). The CTTM message indicates that network device 101A is going to send the tokens in the tokenization table 102 and optionally the data to the network device 101B.

Network device 101B generates a device secret (D2S) in step 308. For example, the network device 101B uses a random number generator to generate the device secret (D2S). The network device 101B computes the network device 101B nonce as D2N=$g^{D2S}$ mod p in step 310. Network device 101B sends a Change Token Table Acknowledgement Message (CTTAM) with the D2N in step 312.

The network device 101A computes a final secret (FS) =$D2N^{D1S}$ mod p in step 314. Likewise, the network device 101B computes the FS=$D1N^{D2S}$ mod p in step 318. The network device 101A computes the new token (NToken) 1 as KDF(FS) in step 316. Likewise, network device 101B computes the new token (NToken) as KDF(FS) in step 320. At this point, both the network device 101A and the network device 101B now have the first token for in the tokenization table 102 (e.g., 11BCNX114433X4 (a shared secret)). At this point, network device 101B does not yet have the data for the token.

The network device 101A computes, in step 322, a token for a Token for Serial Message (CTSM) that is D1H=HMAC (D1N) using NToken as the key. The network device 101A sends, in step 324, the CTSM message that contains the D1H. The network device 101B verifies the HMAC of the DH1 using NToken in step 326. The network device 101B computes, in step 328, a token acknowledgement message as D2H=HMAC(DN2) using NToken as key. The network device 101B sends, in step 330, the Token Acknowledgement message with D2H. The network device 101A verifies the Token Acknowledgement message by verifying a HMAC of D2H using NToken in step 332.

The data associated with the NToken is sent in step 336 as described above in step 230. The process is repeated for the tokens 2-N and the data in steps 302-334. The NToken generated in steps 316/320 is used as the common key for generating the next token in the tokenization table 102.

Once the final token is generated in steps 316/320 and the data for the final token is sent in step 334, the process of steps 234-238 are repeated to finalize the tokenization table 102 exchange. At a later point in time, if an update to the tokenization table 102 is wanted. For example, there are new credit card numbers that need to be added to the tokenization table 102, the same process can be used to update the tokenization table 102.

If new tokens/data are added at the end of the tokenization table 102, the process can only send the update to the tokenization table 102. In this case the message of step 306 would be an add to token table message (ATTM). The process would then exchange new updates to the tokenization table 102. The update would then be added to the tokenization table 102.

Another key advantage is that this process can be used to only change the tokens in the tokenization table 102. For example, if the tokens were to be periodically changed, the same process can be used to only update the tokens (not the data). To do this, the message 306 would indicate that the exchange is only for exchanging tokens (a change tokens only message (CTOM)). In this embodiment, step 334 is not used because there is no need to send the data. The process of dynamically just changing the tokens in the tokenization table 102 could work with any existing tokenization tables 102 and is not dependent upon how the data/tokens are initially exchanged.

The above process can have a check if the same token is generated for a second entry in the tokenization table 102 (a possibility if the token size is the same as the size of the tokenization table 102). For example, if you have the tokenization table size that is the same as the data size, you will ensure that each token in the tokenization table 102 is generated properly and there are no duplicate entries.

The processes described above uses different types of messages, such as, the CTTM message, the ATTM message, and the CTOM message. Since the indicators of the messages may be sent unencrypted, a hashing algorithm may be employed where the message number is added to the original key or current key so that the message type can be confirmed as legitimate. Alternatively, the message number may be encrypted using the current token or some other process to prevent someone from change the message number.

Another option is to have a tokenization table 102 that is larger than the data size. For example, if the data size is 10 digits long and the generated size of the tokenization table 102 is $2^{11th}$ or larger. This allows for empty entries in the tokenization table 102. If one or more attempts to access empty entries are determined, a lockout mechanism may be employed based on a threshold. For example, the user may be locked out for a period of time based on a threshold number of attempts or until an administrator allows more attempts.

An advantage to having larger table sizes is that the empty entries can be filed with honeypot information. Alternatively, honeypot information can be provided based on an attempt to access an empty entry. For example there may be a separate table of honeypot information that can be used to provide the honeypot information. Thus, if someone provides a bad token in an attempt to hack the tokenization table 102 the honeypot information is provided. In addition, if someone gets the whole tokenization table 102 (where the tokenization contains honeypot information, the honeypot information may obfuscate the real data.

The system could also dynamically create a new size of the tokenization table 102 that is part of the exchange process. This can be done by the changing how the key derivation function works and sending a command to change the table size and then send the updated tokens/data.

One key advantage is that the tokenization table 102 can be exchanged without sending the actual data. Traditional encryption algorithms send the data using a key. The process can also be used with traditional encryption algorithms for sending the data itself. Another advantage is that the tokens in a tokenization table 102 can be dynamically changed without directly sending the tokens.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM1926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device (s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A first network device comprising:
   a microprocessor; and
   a computer readable medium, coupled with the microprocessor and comprising microprocessor readable and executable instructions that, when executed by the microprocessor, cause the microprocessor to:
   compute a first network device nonce, wherein the first network device nonce is based on a first network device secret;
   send a Change Token Table Message (CTTM) to a second network device, wherein the CTTM comprises the first network device nonce;
   receive, from the second network device, a Change Token Table Ack Message (CTTAM) with a second network device nonce; and
   compute a new token for a tokenization table based on the first network device secret, the second network device nonce, a prime number, and a key derivation function, wherein the new token for the tokenization table is also computed by the second network device based on a second network device secret, the first network device nonce, the prime number, and the key derivation function.

2. The first network device of claim 1, wherein the CTTM further comprises Diffie-Hellman parameters.

3. The first network device of claim 2, wherein the CTTM further comprises a Hashed Message Authentication Code (HMAC) of the first network device nonce.

4. The first network device of claim 1, wherein the microprocessor readable and executable instructions further cause the microprocessor to:
   send a Compute Token for Serial Message (CTSM), wherein the CTSM comprises a Hashed Message Authentication Code (HMAC) of the first network device nonce using the new token for the tokenization table as an encryption key and wherein the HMAC of the first network device nonce using the new token for the tokenization table as an encryption key is used by the second network device to verify CTSM.

5. The first network device of claim 1, wherein data associated with the new token for the tokenization table is sent using an encryption algorithm that uses the new token as an encryption key.

6. The first network device of claim 1, wherein the computing of the first network device nonce, sending the CTTM, receiving the CCTAM, and computing the new token are repeated to compute and exchange a plurality of tokens in the tokenization table.

7. The first network device of claim 1, wherein a size of the tokenization table is greater than a number of all tokens in the tokenization table.

8. The first network device of claim 7, wherein because of the greater size of the tokenization table than the number of all tokens, the tokenization table comprises one or more empty spaces and where honeypot data is used when a token references the one or more empty spaces.

9. The first network device of claim 1, wherein the microprocessor readable and executable instructions further cause the microprocessor to:

send a Token Table Finalize Message (TTFM);
receive a Token Table Complete Message (TTCM);
send a Tokenization Table Commit Message (TTCM); and
receive a Tokenization Table Commit Ack Message (TTCAM); and
use the tokenization table.

10. A method comprising:
computing, by a microprocessor, a first network device nonce, wherein the first network device nonce is based on a first network device secret;
sending, by the microprocessor, a Change Token Table Message (CTTM) to a second network device, wherein the CTTM comprises the first network device nonce;
receiving, by the microprocessor, from the second network device, a Change Token Table Ack Message (CTTAM) with a second network device nonce; and
computing, by the microprocessor, a new token for a tokenization table based on the first network device secret, the second network device nonce, a prime number, and a key derivation function, wherein the new token for the tokenization table is also computed by the second network device based on a second network device secret, the first network device nonce, the prime number, and the key derivation function.

11. The method of claim 10, wherein the CTTM further comprises Diffie-Hellman parameters.

12. The method of claim 11, wherein the CTTM further comprises a Hashed Message Authentication Code (HMAC) of the first network device nonce.

13. The method of claim 10, further comprising:
sending a Compute Token for Serial Message (CTSM), wherein the CTSM comprises a Hashed Message Authentication Code (HMAC) of the first network device nonce using the new token for the tokenization table as an encryption key and wherein the HMAC of the first network device nonce using the new token for the tokenization table as an encryption key is used by the second network device to verify the CTSM.

14. The method of claim 10, wherein data associated with the new token for the tokenization table is sent using an encryption algorithm that uses the new token as an encryption key.

15. The method of claim 10, wherein the computing of the first network device nonce, sending the CTTM, receiving the CCTAM, and computing the new token are repeated to compute and exchange a plurality of tokens in the tokenization table.

16. The method of claim 10, wherein a size of the tokenization table is greater than a number of all tokens in the tokenization table.

17. The method of claim 16, wherein because of the greater size of the tokenization table than the number of all tokens, the tokenization table comprises one or more empty spaces and where honeypot data is used when a token references the one or more empty spaces.

18. The method of claim 10, further comprising:
sending a Token Table Finalize Message (TTFM);
receiving a Token Table Complete Message (TTCM);
sending a Tokenization Table Commit Message (TTCM); and
receiving a Tokenization Table Commit Ack Message (TTCAM); and
using the tokenization table.

19. A non-transient computer readable medium having stored thereon
instructions that cause a processor to execute a method, the method comprising: instructions to:
compute a first network device nonce, wherein the first network device nonce is based on a first network device secret;
send a Change Token Table Message (CTTM) to a second network device, wherein the CTTM comprises the first network device nonce;
receive, from the second network device, a Change Token Table Ack Message (CTTAM) with a second network device nonce; and
compute a new token for a tokenization table based on the first network device secret, the second network device nonce, a prime number, and a key derivation function, wherein the new token for the tokenization table is also computed by the second network device based on a second network device secret, the first network device nonce, the prime number, and the key derivation function.

20. The non-transient computer readable medium of claim 19, wherein data associated with the new token for the tokenization table is sent using an encryption algorithm that uses the new token as an encryption key.

* * * * *